(12) United States Patent
Koskela et al.

(10) Patent No.: US 8,750,783 B2
(45) Date of Patent: Jun. 10, 2014

(54) EFFICIENT ENABLEMENT FOR WIRELESS COMMUNICATION ON LICENSE-EXEMPT BANDS

(75) Inventors: Timo K. Koskela, Oulu (FI); Sami-Jukka Hakola, Kempele (FI); Anna Pantelidou, Oulu (FI); Samuli Turtinen, Ii (FI)

(73) Assignee: Broadcom Corporation, Irvine, CA (US)

( * ) Notice: Subject to any disclaimer, the term of this patent is extended or adjusted under 35 U.S.C. 154(b) by 218 days.

(21) Appl. No.: 13/234,240

(22) Filed: Sep. 16, 2011

(65) Prior Publication Data

US 2013/0072106 A1 Mar. 21, 2013

(51) Int. Cl.
*H04H 20/71* (2008.01)
*H04W 4/06* (2009.01)

(52) U.S. Cl.
USPC ........ 455/3.01; 455/419; 455/67.11; 455/420

(58) Field of Classification Search
USPC ......... 455/3.01, 434, 450, 3.03, 414.1, 452.1, 455/458, 509, 67.11, 550.1, 551, 419, 420, 455/552.1; 370/312, 278, 336, 329, 252
See application file for complete search history.

(56) References Cited

U.S. PATENT DOCUMENTS

| 2004/0213294 | A1* | 10/2004 | Hughes | 370/485 |
| 2010/0061326 | A1* | 3/2010 | Lee et al. | 370/329 |
| 2012/0243433 | A1* | 9/2012 | Kneckt et al. | 370/252 |

FOREIGN PATENT DOCUMENTS

| WO | WO2011/111918 A | 9/2011 |
| WO | 2012097341 | 7/2012 |

OTHER PUBLICATIONS

Wang, Jiang; "Emerging cognitive radio applications: A survey," IEEE Communications Magazine, Mar. 1, 2011, IEEE Service Center, Piscataway, US; vol. 49; p. 74-81.
Format of individual frame types Section 8.3, Part II: Wireless LAN Medium Access Control (MAC) and Physical Layer (PHY) Specifications, IEEE Draft P802.11 REVmb/D8.01, May 2011, pp. 409-442.
"Secure Enablement and CVS without Persistent Association", S. Abraham, IEEE 802.11-11/0908r1, Jun. 2011, 10 pgs.
Second Memorandum Opinion and Order, in the Matter of Unlicensed Operation in the TV Broadcast Bands, Addition Spectrum for Unlicensed Devices Below 900 MHz and in the 3 GHz Band, FCC, Sep. 23, 2010, 101 pgs.
"3rd Generation Partnership Project; Technical Specification Group Radio Access Network; Evolved Universal Terrestrial Radio Access (E-UTRA); Radio Resource Control (RRC);Protocol specification (Release 10)", 3GPP TS 36.331 V10.2.0, Jun. 2011, 294 pgs.
"Part 11: Wireless LAN Medium Access Control (MAC) and Physical Layer (PHY) specifications, Amendment 3: TV White Spaces Operation", IEEE P802.11af/D1.02, Jun. 2011, 139 pgs.

* cited by examiner

*Primary Examiner* — John J Lee
(74) *Attorney, Agent, or Firm* — Stanton IP Law

(57) ABSTRACT

A fixed or Mode II device enables a Mode I device for license exempt operation by providing to it a list of available license exempt radio channels and a parameter indicating an interval at which contact verification signals CVSs are to be sent. The CVSs verify whether the list remains valid. The fixed/Mode II device then repeatedly sends contact verification signals spaced in time from one another according to the interval. In various embodiments the parameter may be an explicit indication (number of seconds or number of beacons between consecutive CVSs), or it may be implicit (derived from an ID of the fixed/Mode II or Mode I device or a frequency channel, in which the relevant ID is the parameter). A plurality of enabled Mode I devices each gets a device-specific list, and in one embodiment the interval is the same for each of them and the explicit indication is broadcast while in another the parameter is provided to each of them via unicast messages and the interval may differ.

20 Claims, 6 Drawing Sheets

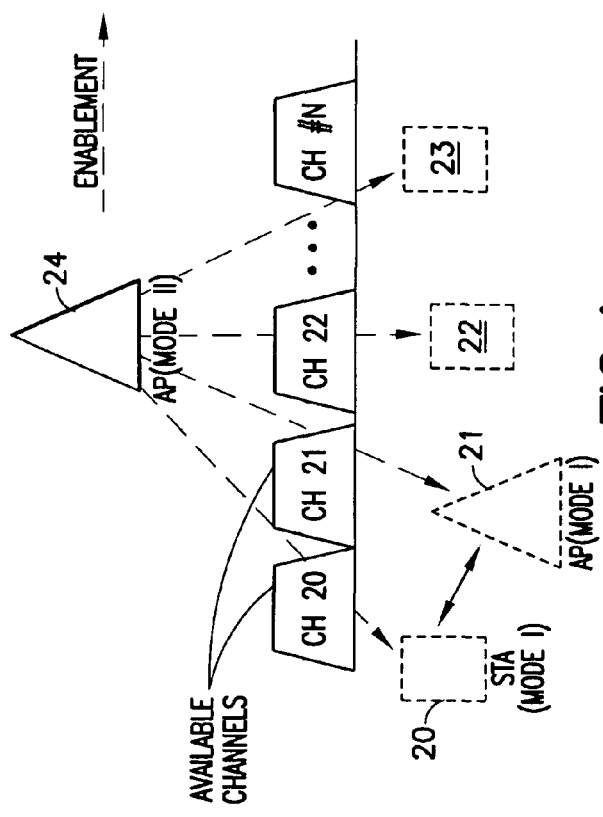
FIG.1
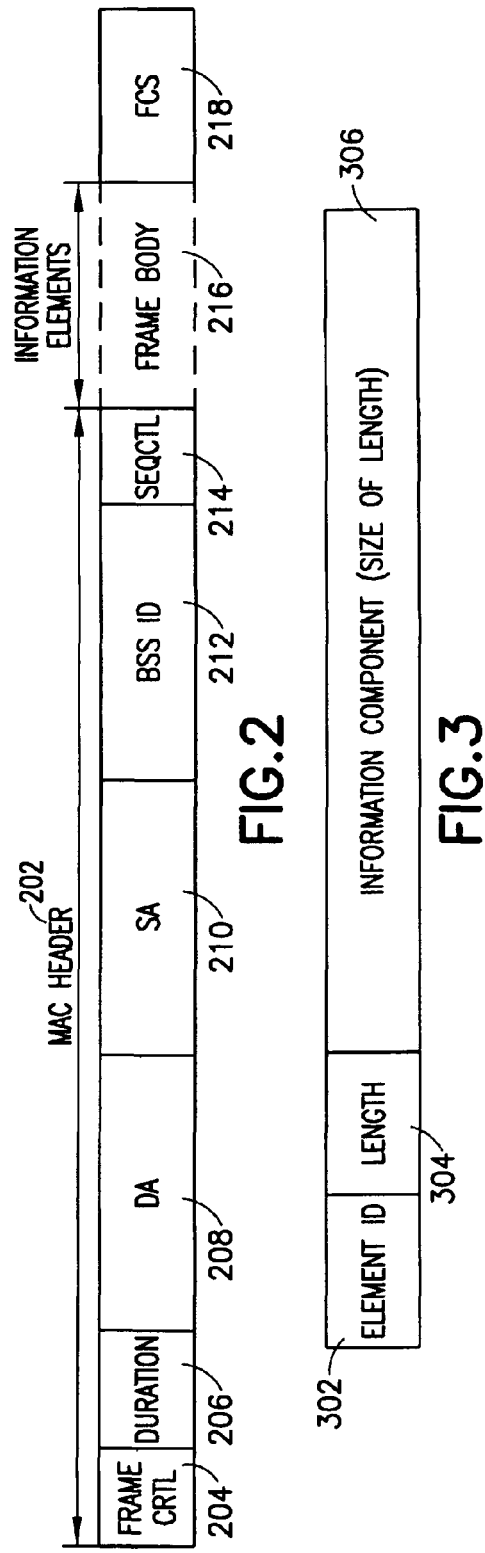
FIG.2
FIG.3

```
-- ASN1START

SystemInformationBlockType1 message

SystemInformationBlockType1 ::=      SEQUENCE {
    cellAccessRelatedInfo            SEQUENCE {
        plmn-IdentityList            PLMN-IdentityList,
        trackingAreaCode             TrackingAreaCode,
        cellIdentity                 CellIdentity,
        cellBarred                   ENUMERATED {barred, notBarred},
        intraFreqReselection         ENUMERATED {allowed, notAllowed},
        csg-Indication               BOOLEAN,
        csg-Identity                 CSG-Identity                            OPTIONAL   -- Need OR
    },
    cellSelectionInfo                SEQUENCE {
        q-RxLevMin                   Q-RxLevMin,
        q-RxLevMinOffset             INTEGER (1..8)                          OPTIONAL   -- Need OP
    },
    p-Max                            P-Max                                   OPTIONAL   -- Need OP
    freqBandIndicator                INTEGER (1..64),
    schedulingInfoList               SchedulingInfoList,
    tdd-Config                       TDD-Config                              OPTIONAL   -- Cond TDD
    si-WindowLength                  ENUMERATED {
                                         ms1, ms2, ms5, ms10, ms15, ms20, ms40},
    systemInfoValueTag               INTEGER (0..31),
    nonCriticalExtension             SystemInformationBlockType1-v890-IEs    OPTIONAL
}

SystemInformationBlockType1-v890-IEs ::= SEQUENCE {
    lateNonCriticalExtension         OCTET STRING                            OPTIONAL   -- Need OP
    nonCriticalExtension             SystemInformationBlockType1-v920-IEs    OPTIONAL
}
```

FIG.4A

| FIG.4A |
| FIG.4B |

FIG.4

```
SystemInformationBlockType1-v920-IEs ::= SEQUENCE {
    ims-EmergencySupport-r9         ENUMERATED {true}          OPTIONAL,   -- Need OR
    cellSelectionInfo-v920          CellSelectionInfo-v920     OPTIONAL,   -- Cond RSRQ
    nonCriticalExtension            SEQUENCE { } }             OPTIONAL    -- Need OP
}

PLMN-IdentityList ::= SEQUENCE (SIZE (1..6)) OF PLMN-IdentityInfo
PLMN-IdentityInfo ::= SEQUENCE {
    plmn-Identity                   PLMN-Identity,
    cellReservedForOperatorUse      ENUMERATED {reserved, notReserved}
}

SchedulingInfoList ::= SEQUENCE (SIZE (1..maxSI-Message)) OF SchedulingInfo
SchedulingInfo ::= SEQUENCE {
    si-Periodicity                  ENUMERATED {
                                        rf8, rf16, rf32, rf64, rf128, rf256, rf512},
    sib-MappingInfo                 SIB-MappingInfo
}

SIB-MappingInfo ::= SEQUENCE (SIZE (0..maxSIB-1)) OF SIB-Type
SIB-Type ::= ENUMERATED {
    sibType3,  sibType4,  sibType5,  sibType6,
    sibType7,  sibType8,  sibType9,  sibType10,
    sibType11, sibType12-v920, sibType13-v920, spare5,
    spare4, spare3, spare2, spare1, ... }

CellSelectionInfo-v920 ::= SEQUENCE {
    q-QualMin-r9                    Q-QualMin-r9,
    q-QualMinOffset-r9              INTEGER (1..8)             OPTIONAL    -- Need OP
}

-- ASN1STOP
```

FIG.4B

EFFICIENT ENABLEMENT FOR WIRELESS COMMUNICATION ON LICENSE-EXEMPT BANDS

CROSS REFERENCE TO RELATED APPLICATION

Subject matter detailed herein is related to that detailed at co-owned U.S. patent application Ser. No. 13/184,702, filed on Jul. 18, 2011 and entitled 'Wireless Network Operation on License-Exempt Band". That related application is herein incorporated in its entirety.

TECHNICAL FIELD

The exemplary and non-limiting embodiments of this invention relate generally to wireless communication systems, methods, devices and computer programs and, more specifically, relate to techniques and procedures for keeping devices enabled for communication over available license-exempt channels.

BACKGROUND

The following abbreviations that may be found in the specification and/or the drawing figures are defined as follows:
CVS contact verification signal
DA destination address
E-UTRAN evolved UMTS terrestrial radio access network
FCC Federal Communications Commission
IBSS independent basic service set
ID identifier
IEEE Institute for Electrical and Electronics Engineers
MAC medium access control
RX receive
SA sender address
SSID service set identifier
TVBD television band device
TVWS television white spaces
TX transmit
WLAN wireless local area network To alleviate congestion in conventional cellular spectrum, research has turned recently to exploiting license-exempt radio spectrum such as the industrial, scientific and medical (ISM) band and what in the United States are known as TVWS, which is a particular portion of the license-exempt spectrum which was at one time set aside for television broadcast but which in recent years has become increasingly available for other radio communications. In general license-exempt radio spectrum is sometimes referred to as a shared band, contrasted with conventional cellular systems which utilize radio spectrum for which the system operator holds a license from a government regulator such as the FCC in the United States. Administration of wireless operations on such license-exempt bands is quite country-specific at least at this early stage, with the FCC implementing regulations for use of the TVWS in the United States.

In the United States it is envisioned that there will be whitespace or TV band databases indicating, for specific geographic areas or geo-locations, which portions of that license-exempt spectrum are available to parties other than those involved with television broadcasting. Such portions may be identified in the relevant database as indexed channels, bandwidth and center frequency, upper and lower frequency bounds, or other frequency-definitive parameters.

Relevant to TVWS in the United States, the FCC defines two concepts for aiding users in finding available channels; a TV bands database as summarized above and the geo-location capability. See for example document FCC 10-174; SECOND MEMORANDUM OPINION AND ORDER; UNLICENSED OPERATION IN THE TV BROADCAST BANDS—ADDITIONAL SPECTRUM FOR UNLICENSED DEVICES BELOW 900 MHz AND IN THE 3 GHz BAND (adopted and released Sep. 23, 2010). The TV band database is to maintain records of all authorized services in the TV frequency bands and so is capable of determining the available channels as a specific geographic location. Such available (or equivalently the used) channels are provided as lists to TVBSs that have been certified under the FCC's equipment authorization procedures. Some of the TVBDs will have a geo-location capability, and those devices should be able to determine their own geographic coordinates within a certain level of accuracy (+/−50 m). This capability is used with a TV bands database to determine the availability of TV channels at a TVBD's geo-location. The FCC defines several types of TVBDs as follows based on those devices' characteristics.

A fixed TVBD is located at a specified fixed location and has the following functions/capabilities: it can select a channel from the TV bands database; it can initiate and operate a network (by sending enabling signals to other fixed TVBDs and/or personal/portable TVBDs); and it can provide to a Mode I personal/portable device (see below) a list of available channels on which the Mode I device may operate (currently, above TV channel 20) and a supplemental list of available channels for Mode I devices (these available channels are adjacent to occupied TV channels and are those on which a fixed TVBD cannot operate). Examples of what may operate as a fixed TVBD in the LTE system include an access node/ eNodeB, a mobility management entity MME, a serving gateway S-GW, a local gateway L-GW, and a packet gateway P-GW. Similarly functioning nodes in other radio access networks may also serve the functions of a fixed TVBD. The maximum power a fixed TVBD is allowed to deliver to its TX antenna shall not exceed 1 W, and the maximum power spectral density (any 100 kHz during any time interval of continuous transmission) is 12.2 dBm.

A Mode I personal/portable device is another of the FCC's TVBD types. This type does not use any internal geo-location capability it may have (if any) to find its TVWS channels so even if it can access a TV bands database the mode I device must obtain its channel list from either a fixed TVBD or from a Mode II personal/portable TVBD (see below). A Mode I device may operate only as a client or dependent station/ device, but not as an enabling station/device.

A Mode II personal/portable device is a portable device having similar functions as a fixed TVBD, but does not need to transmit/receive signals at a specified and fixed place. For personal/portable TVBDs, the maximum effective isotropic radiated power (EIRP) is 100 mW (20 dBm). If the personal/ portable TVBD does not meet the adjacent channel separation requirements (the distance between the TVBD and the TV station is smaller than the minimum distance requirement), the maximum EIRP is set to 40 mW (16 dBm). The maximum power spectral densities for personal/portable devices operating adjacent to occupied TV channels is −1.6 dBm, otherwise 2.2 dBm.

And finally the FCC has designated a sensing only device, which is a personal/portable TVBD that uses spectrum sensing to determine a list of available channels. It can use the frequency bands 512-608 MHz (TV channels 21-36) and 614-698 MHz (TV channels 38-51). Currently, the FCC defines spectrum sensing only for personal/portable TVBDs. The maximum power spectral density for sensing only devices is −0.8 dBm.

The IEEE 802.11 af standard being drafted (D1.02; June 2011) is intended to amend the 802.11 specification for TVWS operation by, among other aspects, fulfilling the above requirements. The document FCC 10-174 cited above further requires that Mode I devices are to be enabled by a (fixed or) Mode II device (called enabling station), and then once enabled the Mode I device may start transmission on an available television channel or channels (more generally, a TVWS frequency resource).

A problem arises in the procedure for enabling a Mode I device. Having first obtained the list of available TVWS channels, the Mode I device must receive a CVS at least every 60 seconds to verify its list. Such as CVS signal is shown at reference number 412 of FIG. 4 in the above-referenced co-owned U.S. patent application Ser. No. 13/184,702. At §15.71 of the above referenced document FCC 10-174 the CVS is defined as follows:

"(b) Contact verification signal. An encoded signal broadcast by a fixed or Mode II device for reception by Mode I devices to which the fixed or Mode II device has provided a list of available channels for operation. Such signal is for the purpose of establishing that the Mode I device is still within the reception range of the fixed or Mode II device for purposes of validating the list of available channels used by the Mode I device and shall be encoded to ensure that the signal originates from the device that provided the list of available channels. A Mode I device may respond only to a contact verification signal from the fixed or Mode II device that provided the list of available channels on which it operates. A fixed or Mode II device shall provide the information needed by a Mode I device to decode the contact verification signal at the same time it provides the list of available channels."

In practice the transmission interval of the CVS signal should be more frequent, because in case there is only one CVS transmission during a 60 second period a mode I device which misses it would have to stop operation on TVWS and get re-enabled before it can transmit again. Or if the 60 second time limit is approaching the Mode I can request CVS enablement from the Mode II device which originally provided the list, in which case the Mode II device does not have to track the 60 second timer for every device which it has enabled.

The FCC regulations provide that the Mode II device which provided the channel list for a Mode I device is also required to transmit CVS signaling to each of its enabled devices. But a given Mode II device may enable several Mode I devices on several different channels, and herein lies the problem which is illustrated by example at FIG. 1.

There is a Mode II AP 24 which enables communication on several channels, shown by example as starting from channel #20 (Ch20) up to channel #N (Ch#N). The enablement may be non-contiguous meaning that certain channels between Ch20 and Ch#N will not be available at this particular location. By enabling multiple STAs 20, 22, 23 and potentially also APs (mode I APs) 21 on different channels, on different parts of spectrum, the enablement signaling load of Mode II AP increases. For multiple Mode I devices enabled by a single Mode II device, this is too high of a burden to the enabling device 24 which must frequently re-check the TVWS database and redistribute the channel list. The conventional procedure is also seen to be too high a burden on the enabled Mode I devices 20-23.

Apart from the documents FCC 10-174 and IEEE 802.11af noted above, also relevant to these teachings are:
document IEEE 802.11-11/908r1 entitled "Secure Enablement and CVS without Persistent Association", by Qualcomm (Jul. 5, 2011);
Section 8.3 of IEEE Draft P802.11-REVmb™/D8.01 (May 2011) concerning frame type formats; and
3GPP TS 36.331 V10.2.0 (2011-06) (Release 10).

SUMMARY

In a first exemplary embodiment of the invention there is an apparatus comprising at least one processor and at least one memory storing a computer program. In this embodiment the at least one memory with the computer program is configured with the at least one processor to cause the apparatus to at least: enable a device for operation in a license exempt spectrum by providing to the device a list of available license exempt radio channels; provide to the device a parameter indicating an interval at which contact verification signals are to be sent, in which the contact verification signals verify whether the list remains valid and repeatedly send contact verification signals spaced in time from one another according to the interval.

In a second exemplary embodiment of the invention there is a method comprising: enabling a device for operation in a license exempt spectrum by providing to the device a list of available license exempt radio channels; providing to the device a parameter indicating an interval at which contact verification signals are to be sent, in which the contact verification signals verify whether the list remains valid; and repeatedly sending contact verification signals spaced in time from one another according to the interval.

In a third exemplary embodiment of the invention there is a computer readable memory storing a computer program, in which the computer program comprises: code for enabling a device for operation in a license exempt spectrum by providing to the device a list of available license exempt radio channels; code for providing to the device a parameter indicating an interval at which contact verification signals are to be sent, in which the contact verification signals verify whether the list remains valid; and code for repeatedly sending contact verification signals spaced in time from one another according to the interval.

In a fourth exemplary embodiment of the invention there is an apparatus comprising at least one processor and at least one memory storing a computer program. In this embodiment the at least one memory with the computer program is configured with the at least one processor to cause the apparatus to at least: receive from an enabling device a list of available license exempt radio channels; and determine an interval, from a parameter received from the enabling device, at which contact verification signals are spaced in time from one another, in which the contact verification signals verify whether the received list remains valid.

In a fifth exemplary embodiment of the invention there is a method comprising: receiving from an enabling device a list of available license exempt radio channels; and determining an interval, from a parameter received from the enabling device, at which contact verification signals are spaced in time from one another, in which the contact verification signals verify whether the received list remains valid.

In a sixth exemplary embodiment of the invention there is a computer readable memory storing a computer program, in which the computer program comprises: code for receiving from an enabling device a list of available license exempt radio channels; and code for determining an interval, from a parameter received from the enabling device, at which contact verification signals are spaced in time from one another, in which the contact verification signals verify whether the received list remains valid.

These and other embodiments and aspects are detailed below with particularity.

BRIEF DESCRIPTION OF THE DRAWINGS

FIG. 1 is an illustration of a single Mode II device enabling four Mode I devices on different TVWS channels, and illustrates an environment in which embodiments of the invention may be practiced to advantage.

FIG. 2 is a schematic diagram showing the frame structure of a conventional management frame in an IEEE 802.11af radio access system.

FIG. 3 is a schematic diagram showing the conventional structure of a generic variable length information element disposed in the frame body of the FIG. 2 management frame which may be adapted to include the CVS information detailed herein.

FIG. 4 is a conventional system information block in an E-UTRAN/LTE system which may be extended according to these teachings to include the CVS information detailed herein.

DETAILED DESCRIPTION

Figure 5:
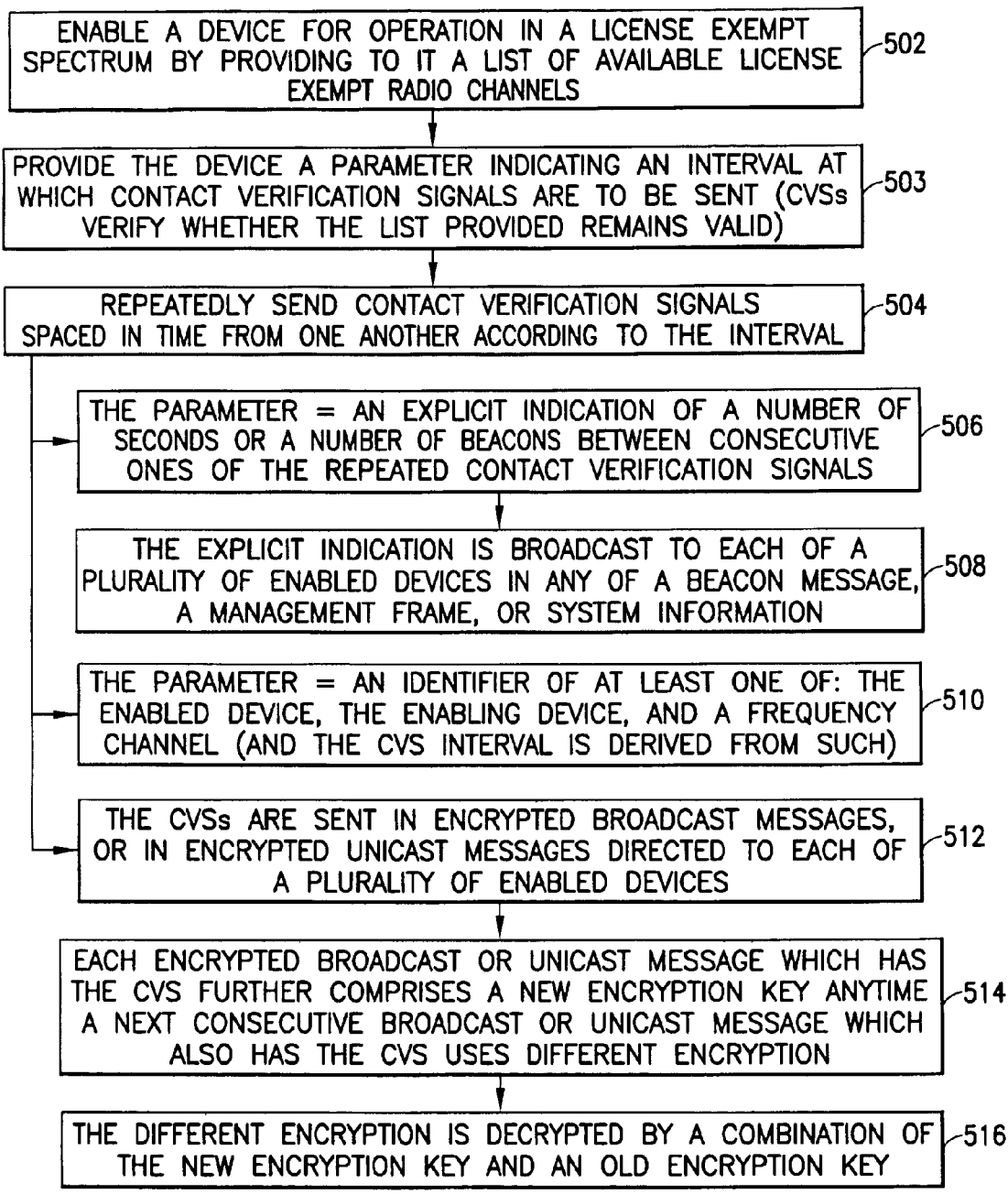
FIG. 5 is a logic flow diagram that illustrates the operation of a method, and a result of execution of computer program instructions embodied on a computer readable memory, from the perspective of the enabling device 24 of FIG. 1 in accordance with the exemplary embodiments of this invention.

While the exemplary embodiments detailed below are in the context of WLAN and other similar ad hoc networks, these teachings apply also to other structured radio access technologies such as for example global system for mobile communication (GSM), universal terrestrial radio access network (UTRAN), evolved UTRAN (E-UTRAN), and their future evolutions. Since the terminology for the various devices may be country specific, the FCC Mode II device is more generally termed an enabling device and an FCC fixed device may also operate as an enabling device; the FCC Mode I device is more generally termed an enabled device; and the TVWS is more generally referred to as license exempt bands or channels.

First consider the scenario by which the first enabled device 20 of FIG. 1 becomes enabled by the enabling device 24 (though the same applies to any of the enabled devices 20-23). In the WLAN or ad hoc context the enabled devices 20-23 are operating as (non-access point) stations STA and the enabling device is operating as an access point AP. It is notable that the different enabled devices 20-23 may be enabled for different license exempt channels as shown at FIG. 1; having them all enabled for the same license-exempt channel is likely to result in interference or undue delay when they all compete for resources using some contention procedure.

After authentication and association the first enabled device 20 receives encryption keys for the CVS reception from the enabling device 24. The first enabled device 20 will not stay associated since it may have no data but wishes to remain enabled. Some reasons it may wish to remain enabled despite having no data to send is to operate on the unlicensed band (for example, set up an IBSS network), or to connect to an access point which is also a mode I device (such as the Mode I device 21 which is a WLAN AP for other WLAN devices/stations 20, 22 in its coverage area and which is enabled by the enabling device 24) area), or to setup communications quickly after going into a sleep mode.

According to an exemplary embodiment of these teachings, the enabling device transmits an indication of the CVS transmission periodicity. This indication of the CVS interval may be broadcast in the enabling device's beacon message, or it may be transmitted in a management frame such as for example an action frame or in the enabling device's broadcast system information. Depending on the type of management frame they may be broadcasted or uncasted. In one embodiment the CVS interval is the same for all of the enabled devices, and this embodiment is most easily implemented if the parameter indicating the CVS interval is broadcast; in another embodiment the CVS interval is different for at least two of the enabled devices (or at least the CVS interval is not necessarily the same for them all), and this embodiment is most easily implemented if the parameter indicating the CVS interval is sent to the enabled devices via individual unicast messages. In various implementations this CVS interval may be expressed as a clock measurement such as a number of milliseconds, or as a system frame measurement such as a number of beacons between CVS transmissions. So while the enabling device 24 can enable the various enabled devices 20-23 on multiple and/or different license exempt channels, the enabling device 24 needs to transmit the CVS interval indication on only one channel and that indicated CVS interval is valid for all the channels which the enabling device 24 has included in the Available Channel List which the enabling device 24 most recently provided to all its various enabled devices 20-23. For the case in which there is a single CVS interval for all of the devices, it is valid for all the channels which the enabling device 24 has included in the all of the Available Channel Lists which it provided to the various plurality of enabled devices 20-23.

In one exemplary embodiment, the enabling device 24 also indicates the specific channel or channels on which it will send the CVS transmission or transmissions. That is, the CVS transmission may configure a specific one (or more) of the enabled devices 20-23 for a specific channel on which that enabled device(s) is to receive its CVS transmission. Even if there are multiple CVS transmissions to different devices on different channels, all such CVS transmissions from the enabling device 24 follow the CVS interval which is indicated on one channel that all the devices can access. So any given device 20-23 which desires to become or to remain enabled, but has no immediate need to transmit its own data, can read the CVS interval indication from the enabling device's 24 beacon (or system information or other management/action frame) and go into a reduced power/sleep mode for a relatively extended period of time. In this manner the enabled devices 20-23 are able to forego checking every beacon from the enabling device 24 and need not be awake for every CVS transmission from the enabling device 24.

A Mode I device 20-23 which is enabled by a Mode II device 24 may obtain the CVS interval from the Mode II device 24 and, in one non-limiting embodiment, may further repeat the Mode II CVS interval information (parameter) in its own broadcast transmission. This is especially useful for the case of an ad hoc network in which the Mode II device 24 sets the same CVS interval for all of its enabled devices 20-23. But in this case the Mode I device repeating the CVS interval information does not re-send the content of the CVS message itself, only the parameter indicating the CVS interval.

The various implementations of the indicated CVS interval mentioned above (number of milliseconds, number of beacons) imply an explicit indication. In other exemplary embodiments the indication can be implicit. For example, the CVS interval may be derived by the various involved devices 20-24 utilizing the device ID given by the network/enabling device 24. In one implementation of this the CVS transmission may be an encrypted broadcast message, and the CVS interval may be derived by applying a function to the access point/enabling device ID and the frequency channel ID. In this case it is efficient for the enabling device 24 to make the CVS interval identical for all of the enabled devices 20-23. In another implementation the CVS transmission is an encrypted unicast message and the CVS interval is derived from the receiving device ID (e.g., the ID of the enabled device 20-23 addressed by the unicast message). If encrypted broadcasting is not supported by the network (which is the case presently with WLAN systems) this embodiment can be used, where the network would then use dedicated signaling to get the encrypted CVS messages to the individual enabled devices 20-23 and the CVS interval is not necessarily identical for all of those enabled devices 20-23 (though if for example a modulo operation is used on the device ID it may be that some but not all enabled devices get identical CVS intervals). In a still further implementation the CVS transmission interval is derived from any combination of the access point ID, the device ID, and the frequency channel ID. Such a device ID may be implemented as a temporary one assigned by the network, such as an association ID for WLAN networks, radio network temporary ID (RNTI) in LTE, and other such network assigned identifiers in other radio access technologies.

The above explicit and implicit implementations can be generalized as the enabling device 24 repeatedly sending CVSs, spaced in time from one another, according to a single interval, in which that interval is indicated by a parameter the enabling device 24 sends to each of the enabled devices 20-23. For the explicit indication the parameter is that explicit indication, which as above may indicate a number of seconds or a number of beacons between consecutive ones of the repeated CVSs. In a most general sense, it is the network/enabling device 24 which configures the CVS interval, as opposed to the conventional FCC rule noted in the background section above which simply mandates a CVS be received by the enabled devices at least once every 60 seconds.

For the implicit indication the parameter may be one or any combination of an identifier an individual one of the plurality of the enabled devices 20-23, an identifier the enabling device 24, and/or an identifier of a frequency channel. These parameters are then inserted into some predetermined function (such as for example a modulo function on the whole identifier or on certain predetermined most or least significant bits thereof) known in advance to both the enabling device 24 and the enabled devices 20-23 (such as may be published in a wireless protocol/standard and locally stored at the various devices 20-24) to derive the interval. For the case of the enabled device ID this is sent in a unicast message; for the case of the enabling device ID this is sent in its system information or possibly also in its beacon; for the case of the frequency channel ID this may be the ID of the channel on which the beacon is sent (and so communicated to the enabled devices 20-23 in system information for example). As another example of the frequency channel ID, the relevant channel may be that over which the CVS signal itself is provided by the Mode II device 24. IN the WLAN system the channels are identified by index numbers, other non-WLAN implementations can use a similar channel index number or other identifier number assigned by the network. Or the network may instead use an ID obtained from combining two or more individual TVWS channels.

In the various implementations above, or any which use an encrypted message for the CVS signal, it is preferable that the encryption be changed from time to time so as to retain its security features. To this end the enabling device 24 provides a new encryption key each time it changes the encryption, and the enabling device 24 provides each new encryption key with the current CVS signal itself just before making the change.

For the above aspects of these embodiments in which there is a change to the encryption key, the key change can be triggered periodically by the enabling device 24 which tracks this via a timer (either a single timer if the CVS interval is the same for all enabled devices 20-23 or multiple timers if there are multiple different CVS intervals running concurrently); if the key has not been changed when the timer expires then expiry of the timer will cause the enabling device 24 to change the encryption. Any time the key is changed, in an embodiment the enabling device 24 will send the current CVS signal with the new key multiple times to better assure the affected enabled device or devices 20-23 are able to obtain it. Just in case any do not, then an enabled device 20-23 which did not obtain the new key can utilize the CVS request procedure (which was noted above in the context of its 60-second CVS timer nearing expiry) to obtain the new encryption key by utilizing the old encryption key. In this case the network/enabling device 24 can configure a validity time for the old key, and the old key used with such a CVS request procedure will be valid to obtain the new key only through the end of that validity time.

In an exemplary embodiment, anytime the enabling device 24 needs to update any enabled device's available channel list, the enabling device 24 will begin the key change procedure. But in other embodiments the key change may be up to the enabling device's discretion, and if a new key is only recently adopted when a channel list update occurs the enabling device 24 may choose not to re-issue a new encryption key.

The encryption keys may be specific per enabled device 20-23. For example, if there is a specific channel list update request triggered by an individual enabled device 20-23 and that request is sent to a fixed enabling device, that fixed enabling device may begin the key change procedure for only that requesting enabled device, or may perform the key update procedure for all of the enabled devices which are using that same channel list which is being updated. In this context the specific channel list refers to a channel list that is only allowable for mode I/II devices, the license exempt available channel list which the mode II device gets from the TVWS database.

For added security in the key change procedure, the signaling to trigger the CVS key change can provide a new sequence which is not a decryption key in and of itself for the new encryption the enabling device 24 is about to use, but which is used together with the old key to derive the actual new decryption key. This derivation can also be a function known to the various devices 20-24 in advance, such as may be published in a wireless protocol/standard and locally stored in their respective memories. This implementation prevents the new decryption key from being sent over the air interface. Any of the enabled devices 20-23 can get the initial decryption key from the enabling device 24 at the time they obtain their initial channel list.

Since the above provisions for various exemplary embodiments have the network/enabling device 24 configuring the CVS interval rather than using some fixed value (e.g., 60 seconds) which applies regardless of which enabling device and traffic conditions, then the network/enabling device can in certain exemplary embodiments also configure the relevant timers in the enabled devices 20-23. These include the timer which triggers a given enabled device 20-23 to send a request for a CVS, which for convenience is denoted as $T_{CVRC}$. The enabled devices 20-23 may need to send a CVS request for example if their decoding (or even decrypting) of the CVS fails and they do not wish to wait an additional interval to see if their allowed channel list is still valid.

By example, the network/enabling device 24 may take considerations of traffic and connectivity requirements of the current service into account when configuring the $T_{CVRC}$ for the enabled devices, and/or may scale this timer with the amount of enabled devices 20-23 that are associated with (enabled by) the enabling device 24. For implementations in which the CVS message is not broadcast by the enabling device 24 (for example, where encryption of broadcast messages is not supported by the system), the enabling device 24 may send the CVSs as unicast frames and set the interval a bit longer than if broadcasting were available, but given the FCC rule detailed in background above such longer interval should still be less than 60 seconds. In any case, the $T_{CVRC}$ which the network/enabling device 24 configures for the enabled devices 20-23 should be greater than the CVS interval it configures and also less than 60 seconds.

For those embodiments in which the CVS is sent in a broadcast message, that same broadcast message may additionally carry information about the available channel list. If the channel list is changed the enabling device 24 will need to inform the enabled devices 20-23 that the channel list has changed, and in this embodiment can inform them also in that same CVS broadcast message. Once the list of available channels does change, the enabling device 24 will then broadcast the new channel list to the enabled devices 20-23 with the same encryption key but the message includes a new key (or new sequence used to derive the new key) which is used for the next encrypted broadcast with the CVS. If the CVS transmission is a broadcast message, the enabled devices 20-23 should not make unicast channel requests to the enabling device 24.

FIG. 2 gives an example of a conventional MAC layer management frame under the 802.11 protocol which can be readily adapted with new information elements to implement the above embodiments concerning broadcasting the CVS signals. While FIGS. 2-3 are in the context of WLAN frames, similar implementations for other radio access technologies are readily adapted from these WLAN examples.

The 802.11 specifications provide for three basic frame types: control frames, data frames, and management frames. Management frames include, among others, beacon frames, public action frames, and action frames. Management frames have fixed headers and information is carried in the frame body in discrete information elements. FIG. 2 illustrates a management frame divided broadly into the frame header 202 and the frame body 216 which carries the information elements.

The header is divided into discrete fields. There is a frame control field 204 which indicates for example the protocol version and frame type (and possibly also frame subtype). There is a duration field 206 which indicates a duration value of the frame, how long it is. There is a DA field 208 which carries the destination MAC address and a SA field 210 which carries the sender MAC address. The header 202 also defines a BSS ID field 212 which carries the basic service set ID for the sender and a sequence control field 214 which contains values for the recipient to check for duplicate frames.

The frame body 216 carries the information elements and certain other fixed fields. Following the frame body 216 is a frame check sequence field 218 that carries a cyclic redundancy checksum of the whole frame. The frame body 216 consists of fixed length fields and variable length information element fields.

FIG. 3 illustrates a generic format for one information element field; there is an identifier field 302 to identify the particular information element, a length field 304 to indicate how long is the information element, and an information component 306 which carries the relevant information for that information element and whose size is governed by the length field 304. In WLAN-specific embodiments of these teachings there may be an information element for the CVS, and which also includes the indication of the CVS interval for those implementations where that indication is explicit.

FIG. 4 gives an example of a System Information Block (SIB) Type 1 message, conventional for the E-UTRAN/LTE radio access technology, and taken from 3GPP 36.331 v 10.2.0 (2011-06). This conventional system information block (or master information block MIB) may be readily adapted/extended to implement the above embodiments concerning broadcasting the CVS related information. FIG. 4 is a non-limiting example; other types of system information blocks can be used to implement this aspect of the invention or a new system information block may be developed to do so. If not broadcast, for the E-UTRAN/LTE system the network/enabling device 24 can configure the UE specific parameters via dedicated radio resource control signaling.

For such a E-UTRAN/LTE implementation, there may additionally be signaling among the higher network node/mobility management entity (MME) and the eNodeB/enabling device 24 and the enabled devices 20-23 so as to implement the CVSs and the CVS interval indications detailed more fully above. For example, each logical entity could be defined to manage its own CVS related encryption keys, and this entity shall interact with the MME and possibly also the home subscriber service HSS of the particular enabled device 20-23.

Embodiments of these teachings provide the technical effect of enabling an enhanced energy savings for the enabled devices 20-23, as well as enabling an efficient multichannel operation by the enabling device 24. Additionally, the enabled devices 20-23 are able to use the available channels indicated by the enabling device 24 without constantly monitoring their own enablement on a specific channel FIG. 5 is a logic flow diagram which describes an exemplary embodiment of the invention from the perspective of the enabling device 24. FIG. 5 represents results from executing a computer program or an implementing algorithm stored in the local memory of the enabling device 24, as well as illustrating the operation of a method and a specific manner in which the enabling device 24 (or one or more components thereof) are configured to cause that overall host electronic device to operate.

Blocks 502 and 504 concern distributing the available channel lists and the CVS interval, respectively. At block 502 a device is enabled for operation in a license-exempt radio spectrum/band by providing to it a list of available license exempt radio channels. Block 503 shows that the device is also provided a parameter indicating an interval at which contact verification signals are to be sent, in which the contact verification signals verify whether the list provided at block 502 remains valid. At block 504, there is repeatedly sent contact verification signals spaced in time from one another according to the interval of block 503.

Further portions of FIG. 5 are directed to certain of the above non-limiting embodiments and implementations. Block 506 tells that the parameter comprises an explicit indication of a number of seconds or a number of beacons between consecutive ones of the repeated contact verification signals. In the examples above there are a plurality of such enabled devices, and as stated at block 508, such an explicit indication may be broadcast to the enabled device in any of a beacon message, a management frame, or system information.

Block 510 tells an alternative embodiment in which the parameter comprises an identifier of at least one of: the enabled device, the enabling device which is performing the elements of FIG. 5, and a frequency channel. In this case the CVS interval is derived from one or more of those identifiers.

Remaining blocks of FIG. 5 relate to encryption. At block 512 the contact verification signals are sent in encrypted broadcast messages, or in encrypted unicast messages directed to each of a plurality of enabled devices individually. At least for the unicast message embodiment, the list of block 502 which is provided to each of a plurality of enabled devices is a device-specific list (though not all such lists are necessarily different; some two or more devices may be enabled using the same channel list). At block 514 each encrypted broadcast or unicast message which has the contact verification signal further comprises a new encryption key anytime a next consecutive broadcast or unicast message which also has the contact verification signal uses different encryption. And finally at block 516, the different encryption is decrypted by a combination of the new encryption key and an old encryption key.

Figure 6:
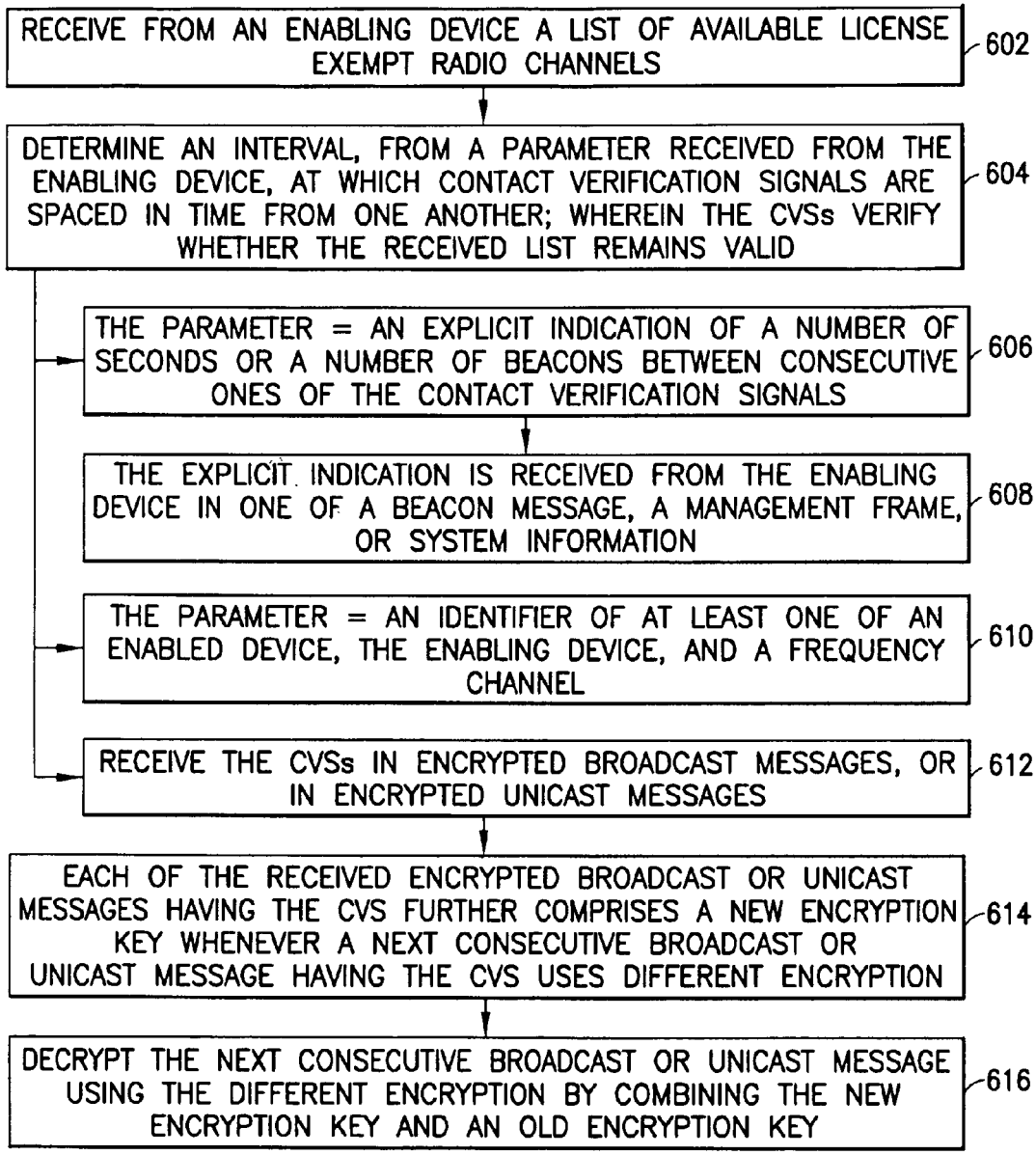
FIG. 6 is a logic flow diagram that illustrates the operation of a method, and a result of execution of computer program instructions embodied on a computer readable memory, from the perspective of an enabled device 20-23 of FIG. 1 in accordance with the exemplary embodiments of this invention.

FIG. 6 is a logic flow diagram which describes an exemplary embodiment of the invention from the perspective of one of the enabled devices 20-23. FIG. 6 represents results from executing a computer program or an implementing algorithm stored in the local memory of one of the enabled devices 20-23, as well as illustrating the operation of a method and a specific manner in which the enabled device 20-23 (or one or more components thereof) are configured to cause that overall host electronic device to operate.

Blocks 602 and 604 concern the enabled device (which may or may not be enabled prior to block 602 depending on whether it had a previous list) obtaining its available channel lists and the CVS interval, respectively. At block 602 it receives from an enabling device a list of available license exempt radio channels; and at block 604 it determines an interval, from a parameter received from the enabling device, at which contact verification signals are spaced in time from one another. The contact verification signals verify whether the list received at block 602 remains valid.

Further portions of FIG. 6 are directed to certain of the above non-limiting embodiments and implementations. Block 606 tells that the parameter comprises an explicit indication of a number of seconds or a number of beacons between consecutive ones of the contact verification signals. Block 608 specifies that the explicit indication is received from the enabling device in one of a beacon message, a management frame, or system information.

Block 610 tells an alternative embodiment in which the parameter comprises an identifier of the enabled device which is performing FIG. 6, the enabling device, and a frequency channel. In this case the interval is derived from the said at least one identifier.

Remaining blocks of FIG. 6 relate to encryption. At block 612 the enabled device further receives the contact verification signals in encrypted broadcast messages, or in encrypted unicast messages directed to that enabled device. At block 614 each of the received encrypted broadcast or unicast messages having the contact verification signal further comprises a new encryption key whenever a next consecutive broadcast or unicast message having the contact verification signal uses different encryption. Block 616 has the enabled device further decrypting the next consecutive broadcast or unicast message using the different encryption by combining the new encryption key and an old encryption key.

The various blocks shown in FIGS. 5 and 6 may be considered as a plurality of coupled logic circuit elements constructed to carry out the associated function(s), or specific result of strings of computer program code stored in a memory. Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 7:
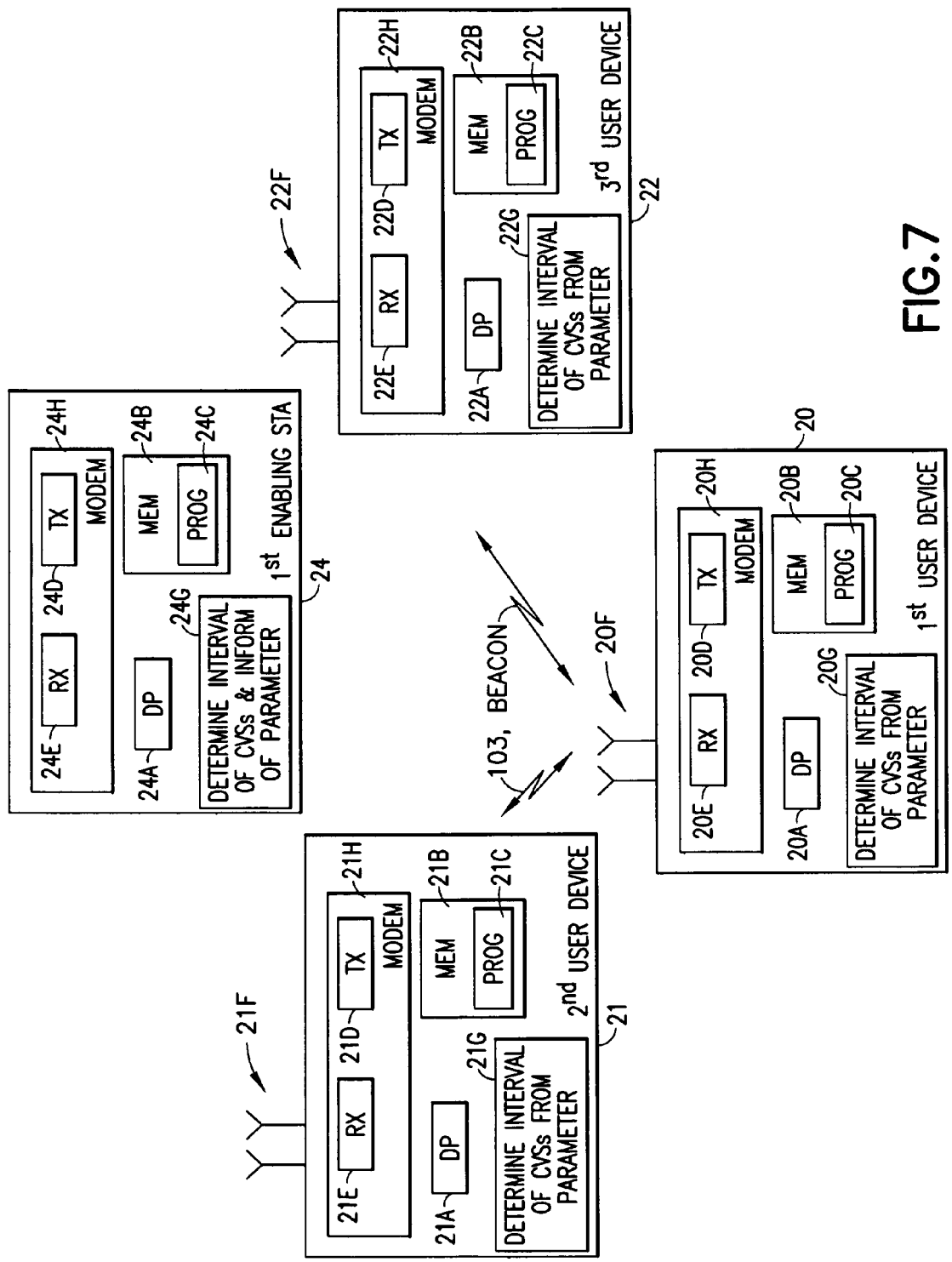
FIG. 7 is a simplified block diagram of various devices shown at FIG. 1, which are exemplary electronic devices suitable for use in practicing the exemplary embodiments of the invention.

Reference is now made to FIG. 7 for illustrating a simplified block diagram of various electronic devices and apparatus that are suitable for use in practicing the exemplary embodiments of this invention. In FIG. 7 an enabling device 24 is adapted for communication over a wireless link (not specifically shown) with mobile apparatuses, such as mobile terminals, UEs or user devices which may implement the various enabled devices 20, 21, 22. The enabling device 24 may be embodied as a macro eNodeB (a base station of an E-UTRAN system), a WLAN access point, a femto eNodeB, or other type of base stations or access points adapted to provide the license-exempt channel lists and CVSs as detailed above.

In one particular implementation, any of the enabled devices 20, 21, 22 may be embodied as a WLAN station STA, either an access point station or a non-access point station. In the case of an access point station, it would function for TVWS and CVS purposes as a dependent/Mode I station enabled by a Mode II device/enabling station 24 and for WLAN purposes as a WLAN access point for any non-access point STAs associated with it under WLAN procedures. In such an embodiment the enabled access point station would not be able to enable any of those associated non-access point STAs for TVWS purposes since it would not be operating as a Mode II or fixed device; for TVWS purposes it is operating only as a Mode I device that is enabled by a different Mode II device 24. But in this case the enabled access point station may still be able to advertise to its associated STAs and any other devices that are in radio range the identifier of its enabling station 24.

The first enabled device 20 includes processing means such as at least one data processor (DP) 20A, storing means such as at least one computer-readable memory (MEM) 20B storing at least one computer program (PROG) 20C, and also communicating means such as a transmitter TX 20D and a receiver RX 20E for bidirectional wireless communications with the enabling device 24 via one or more antennas 20F. The RX 20E and the TX 20D are each shown as being embodied with a modem 20H in a radio-frequency front end chip, which is one non-limiting embodiment; the modem 20H may be a physically separate but electrically coupled component. The first enabled device 20 also has stored in the MEM 20B at block 20G computer program code for determining the CVS interval from the parameter according to the various embodiments and implementations above.

The second enabled device 21 similarly includes processing means such as at least one data processor (DP) 21A, storing means such as at least one computer-readable memory (MEM) 21B storing at least one computer program (PROG) 21C, and communicating means such as a transmitter TX 21D and a receiver RX 21E and a modem 21H for bidirectional wireless communications with the first enabled device 20 as well as the other apparatus of FIG. 7 via one or more antennas 21F. The second enabled device stores in its local MEM 21B at block 21G computer program code for determining the CVS interval from the parameter similar to the first enabled device 20.

Similarly, the third enabled device 22 includes processing means such as at least one data processor (DP) 22A, storing means such as at least one computer-readable memory (MEM) 22B storing at least one computer program (PROG) 22C, and communicating means such as a modem 22H for bidirectional communication with the other devices of FIG. 7. The third enabled device 22 also has stored in its local MEM 22B at block 22G the computer program code for determining the CVS interval from the parameter.

The enabling device 24 also includes its own processing means such as at least one data processor (DP) 24A, storing means such as at least one computer-readable memory (MEM) 24B storing at least one computer program (PROG) 24C, and communicating means such as a transmitter TX 24D and a receiver RX 24E and a modem 24H for bidirectional wireless communications with enabled devices 20, 21, 22 detailed above via its antennas 24F. The enabling device 24 stores at block 24G in its local MEM 24B the parameter or parameters for determining the CVS interval, which it provides to the enabled devices 20, 21, 22 associated to it.

At least one of the PROGs 20C, 21C, 22C, 24C in the respective device 20, 21, 22, 24 is assumed to include program instructions that, when executed by the associated DP 20A, 21A, 22A, 24A, enable the device to operate in accordance with the exemplary embodiments of this invention, as detailed above. Blocks 20G, 21G, 22G and 24G summarize different results from executing different tangibly stored software to implement certain aspects of these teachings. In these regards the exemplary embodiments of this invention may be implemented at least in part by computer software stored on the MEM 20B, 21B, 22B, 24B which is executable by the DP 20A, 21A, 22A, 24A of the various enabling and enabled devices, or by hardware, or by a combination of tangibly stored software and hardware (and tangibly stored firmware). Electronic devices implementing these aspects of the invention need not be the entire devices as depicted at FIG. 7, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 20B, 21B, 22B and 24B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 21A, 22A and 24A include but are not limited to general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus, comprising:
    at least one processor; and
    at least one memory storing a computer program;
    in which the at least one memory with the computer program is configured with the at least one processor to cause the apparatus to at least:
    enable a device for operation in a license exempt spectrum by providing to the device a list of available license exempt radio channels;
    provide to the device a parameter indicating an interval at which contact verification signals are to be sent, in which the contact verification signals verify whether the list remains valid; and
    repeatedly send the contact verification signals spaced in time from one another according to the interval.

2. The apparatus according to claim 1, in which the parameter comprises an explicit indication of a number of seconds or a number of beacons between consecutive ones of the repeated contact verification signals.

3. The apparatus according to claim 2, in which there are a plurality of enabled devices for which the apparatus is configured to provide each with a device-specific list of available license exempt radio channels, the interval is the same for each of the plurality of devices, and the explicit indication is broadcast to each of the plurality of enabled devices in one of: a beacon message, a management frame, or system information.

4. The apparatus according to claim 1, in which there are a plurality of enabled devices for which the apparatus is configured to provide each with a device-specific list of available license exempt radio channels, the parameter is provided to each of the plurality of enabled devices via unicast messages, and the interval is not necessarily the same for each of the plurality of devices.

5. The apparatus according to claim 1, in which the parameter comprises an identifier of at least one of: the device, an enabling device, and a frequency channel; and in which the interval is derived from the said at least one identifier.

6. The apparatus according to claim 1, in which the contact verification signals are sent in encrypted broadcast messages, or in encrypted unicast messages.

7. The apparatus according to claim 6, in which each encrypted broadcast or unicast message having the contact verification signal further comprises a new encryption key when a next consecutive broadcast or unicast message having the contact verification signal uses different encryption.

8. The apparatus according to claim 7, in which the different encryption is decrypted by a combination of the new encryption key and an old encryption key.

9. The apparatus according to claim 1, in which the apparatus comprises a fixed or a Mode II enabling device and the said device is a Mode I enabled device.

10. A method, comprising:
    enabling a device for operation in a license exempt spectrum by providing to the device a list of available license exempt radio channels;
    providing to the device a parameter indicating an interval at which contact verification signals are to be sent, in which the contact verification signals verify whether the list remains valid; and
    repeatedly sending contact verification signals spaced in time from one another according to the interval.

11. The method according to claim 10, in which the parameter comprises an explicit indication of a number of seconds or a number of beacons between consecutive ones of the repeated contact verification signals.

12. The method according to claim 11, in which there are a plurality of enabled devices each of which is provided with a device-specific list of available license exempt radio channels, the interval is the same for each of the plurality of devices, and the explicit indication is broadcast to the devices in one of: a beacon message, a management frame, or system information.

13. The method according to claim 10, in which there are a plurality of enabled devices each of which is provided with a device-specific list of available license exempt radio channels, the parameter is provided to each of the plurality of enabled devices via unicast messages, and the interval is not necessarily the same for each of the plurality of devices.

14. The method according to claim 10, in which the parameter comprises an identifier of at least one of: the device, an enabling device, and a frequency channel; and in which the interval is derived from the said at least one identifier.

15. The method according to claim 10, in which the contact verification signals are sent in encrypted broadcast messages, or in encrypted unicast messages.

16. The method according to claim 15, in which each encrypted broadcast or unicast message having the contact verification signal further comprises a new encryption key when a next consecutive broadcast or unicast message having the contact verification signal uses different encryption.

17. A non-transitory computer readable memory storing a computer program comprising:
    code for enabling a device for operation in a license exempt spectrum by providing to the device a list of available license exempt radio channels;
    code for providing to the device a parameter indicating an interval at which contact verification signals are to be sent, in which the contact verification signals verify whether the list remains valid; and
    code for repeatedly sending contact verification signals spaced in time from one another according to the interval.

18. The non-transitory computer readable memory according to claim 17, in which the parameter comprises an explicit indication of a number of seconds or a number of beacons between consecutive ones of the repeated contact verification signals.

19. The non-transitory computer readable memory according to claim 17, in which the parameter comprises an identifier of at least one of: the device, an enabling device, and a frequency channel;
    and in which the interval is derived from the said at least one identifier.

20. The non-transitory computer readable memory according to claim 17, in which the contact verification signals are sent in encrypted broadcast messages, or in encrypted unicast messages.

* * * * *